United States Patent [19]

Levendis

[11] Patent Number: 5,390,492

[45] Date of Patent: Feb. 21, 1995

[54] FLOW-THROUGH PARTICULATE INCINERATION SYSTEM COUPLED TO AN AERODYNAMICALLY REGENERATED PARTICULATE TRAP FOR DIESEL ENGINE EXHAUST GAS

[75] Inventor: Yiannis A. Levendis, Boston, Mass.

[73] Assignee: Northeastern University, Boston, Mass.

[21] Appl. No.: 201,849

[22] Filed: Feb. 25, 1994

Related U.S. Application Data

[63] Continuation-in-part of Ser. No. 78,972, Jun. 17, 1993, which is a continuation-in-part of Ser. No. 839,171, Feb. 21, 1992, Pat. No. 5,253,476.

[51] Int. Cl.$^6$ .............................................. F01N 3/02
[52] U.S. Cl. ........................................ 60/278; 55/302; 55/DIG. 30; 60/288; 60/311
[58] Field of Search ............... 60/279, 288, 311, 278; 55/302, DIG. 30

[56] References Cited

U.S. PATENT DOCUMENTS

| | | | |
|---|---|---|---|
| 4,833,883 | 5/1989 | Oda | 60/279 |
| 4,864,821 | 9/1989 | Hoch | 60/279 |
| 4,875,335 | 10/1989 | Arai | 60/274 |
| 4,924,668 | 5/1990 | Panten | 60/278 |
| 5,123,243 | 6/1992 | Baddour | 60/274 |

*Primary Examiner*—Douglas Hart
*Attorney, Agent, or Firm*—Weingarten, Schurgin, Gagnebin & Hayes

[57] ABSTRACT

A flow-through particulate incineration system is coupled to an aerodynamically regenerated diesel engine exhaust gas particulate (soot, condensed polynuclear aromatic and aliphatic hydrocarbons, and ash) trap. An incineration chamber is provided downstream of the particulates dislodged from the particulate trap during regeneration thereof by a pulse of compressed air. During regeneration, a valve between the particulate trap and the incineration chamber opens to allows the air and entrained particles to pass into the incineration chamber. A secondary filter is mounted within the incineration chamber to allow passage of the regeneration air therethrough, but prevent passage of the particulates, whereby the particulates are retained in the incineration chamber. A heater in the incineration chamber is periodically activated to burn the particulates collected in the trap. The oxidation products may be exhausted to ambient or may be returned to the engine intake in an exhaust gas recirculation system.

29 Claims, 9 Drawing Sheets

FLOW-THROUGH PARTICULATE INCINERATION SYSTEM COUPLED TO AN AERODYNAMICALLY REGENERATED PARTICULATE TRAP FOR DIESEL ENGINE EXHAUST GAS

RELATED APPLICATION

This application is a continuation-in-part of U.S. Pat. application Ser. No. 08/078,972, filed on Jun. 17, 1993, which is a continuation-in-part of U.S. Ser. No. 839,171, filed Feb. 21, 1992, now U.S. Pat. No. 5,253,476, the disclosures of both of which are incorporated herein by reference.

FIELD OF THE INVENTION

This invention is related to the field of controlling emissions of diesel exhaust gas, and more particularly, to the incineration of diesel particulates trapped by air pulse regenerated diesel particulate filtration systems.

BACKGROUND OF THE INVENTION

The pollution produced by the exhaust from internal combustion engines is increasingly of concern. These pollutants include hydrocarbon, carbon monoxide (CO), nitrogen oxide ($NO_x$), and particulate emissions. The type and amount of emissions depend, among other things, on the type of engine and fuel system and on operating conditions. For example, diesel engines produce relatively low amounts of CO, but produce significant amounts of particulate matter in the form of soot, that is comprised of carbon, ash, that is comprised of inorganics, and polynuclear aromatic and aliphatic hydrocarbons (PAHs), that are condensed about the carbon nuclei of the soot. 1994 U.S. particulate emissions standards require that diesel engines emit particulates of no more than 0.1 g/BHP/hr. $NO_x$ emissions are also a significant problem for diesel engines.

Porous ceramic and other filters have been used to capture unwanted particulate matter in the form of soot, ash, and PAHs condensed about the carbon nuclei of the soot, which are entrained in the emission stream of diesel engines. The soot is "sticky" and adheres quite readily to the walls defining the pores of the ceramic and other filters. However, after prolonged filtration, the soot so accumulates in the filters as to obstruct the pores. An obstructed filter induces a back pressure in the exhaust line which can affect engine operation and reduce the effective throughput of the filters, necessitating the cleaning or replacement of the filters.

Thermal regeneration to remove the accumulated soot from the filters is known, such as by embedding resistive filaments in the ceramic matrix that oxidize the accumulated soot when energized. However, because hot spots tend to be formed thereby that cause thermal failures in the ceramic, not only is care required to prevent degradation of the filter matrix in the locale of the hot spots, but also degraded filters must be periodically monitored to ensure that they comply with the clean air emission standards. Fine ceramic particles can also be eroded and travel downstream, where they can cause damage to the exhaust system piping or to the engine. Further, the PAHs entrained in the diesel exhaust condense at and around 200° to 400° C. Filters which employ thermal regeneration techniques are generally located at the diesel exhaust manifold close to the engine and typically operate at temperatures well above the boiling point of the PAHs, which makes them generally unsuited to unburned PAH emission control or use in a recirculation line. Moreover, thermally regenerated filters are prone to failure by melting and cracking of the ceramic matrix during the high-temperature regeneration periods.

An alternative to thermal regeneration of the soot filters is aerodynamic regeneration using pulses of compressed air flowing through the trap in a direction opposite to the exhaust. In the aerodynamically regenerated traps, the filter encounters relatively low temperatures, in the range of 200° C. to 300° C., since these traps can be placed at any location in the exhaust pipe, even far from the engine. Moreover, the intermittent pulsing of the regeneration compressed air further cools the filter. An example of an aerodynamically regenerated trap is shown in U.S. Pat. No. 4,875,335, entitled "Apparatus and Method for Treating an Exhaust Gas From a Diesel Engine." In U.S. Pat. No. 5,013,340, entitled "Rotating Diesel Particulate Trap", incorporated herein by reference, particulates are continuously removed by rotating a particulate trap such that, while one sector thereof is exposed to diesel exhaust flowing in one direction, another sector thereof is exposed to a counter flowing stream of high-velocity (high-mass) air provided either by a fan or a compressed air tank.

Early aerodynamically regenerated traps channeled the regeneration air to baghouses, where the soot was retained in fiber bags. The bags were cleaned or replaced as needed. The traps functioned effectively in this configuration, since the large filtration area of the fiber bags offered minimal resistance or back pressure to the flow of the regeneration air through the ceramic filter. However, periodically, the bags must be collected and removed, creating a disposal problem. Thus, particulate trap systems were developed incorporating incinerator sections which burned the particulates in a separate chamber, away from the ceramic filter. By burning the particulates away from the ceramic filter, the filter does not experience elevated temperatures and thermal failures are avoided.

A known incineration system uses a dead-flow cylinder positioned directly below the ceramic filter. A heating element is located at the bottom of the cylinder. If the volume of the dead-flow cylinder is sufficiently large, the momentum of the regeneration air is dissipated in the cylinder and the soot eventually settles on the heater. If the volume of the dead-flow cylinder is small, however, the effectiveness of this system is reduced. The performance of this system is satisfactory if regeneration is performed off line, i.e., while the engine is stopped and no exhaust is flowing through the filter. If regeneration occurs on-line, the cleaning effectiveness of the filter deteriorates with time, probably caused by the re-entrainment of soot in the engine-exhaust stream and re-entry into the ceramic filter. Blocking the exit of the incineration chamber with a fibrous filter has not been found to improve this system, since the filter creates large back pressures, impedes the flow of the regeneration air, and quickly becomes plugged.

Exhaust gas recirculation (EGR) is another known pollution control technique which has been successfully used to reduce $NO_x$ emissions in the exhaust stream from a diesel engine. With EGR, a portion of the exhaust is recirculated back into the engine. The exhaust gas replaces a portion of the combustion air in the engine, resulting in less oxygen available to enter into the reactions, and lowers the temperature at which combustion occurs. A lower concentration of $NO_x$ emissions in the exhaust gas stream results.

SUMMARY OF THE INVENTION

The present invention discloses a particulate incineration system coupled to an aerodynamically regenerated diesel engine exhaust gas particulate (soot, condensed polynuclear aromatic and aliphatic hydrocarbons, and ash) control system which overcomes the shortcomings of prior art particulate incineration systems.

According to the invention, a primary diesel soot, ash, and PAH trap is mounted in a trap housing in the flow path of exhaust from a diesel engine. The trap is periodically regenerated by at least one pulse of compressed air to dislodge particles of soot, ash, and PAHs captured therein. An incineration chamber is provided downstream of the dislodged particulates such that the particulates can be directed into the incineration chamber. A valve or other closure device isolates the incineration chamber from the filter housing at all times except during regeneration of the trap. During regeneration, the pulse of compressed air with the entrained particulates passes through the valve into the incineration chamber.

A secondary filter is mounted within the incineration chamber to allow passage of the regeneration air therethrough, but prevent passage of the particulates to retain them in the incineration chamber. To retain the submicron particles of soot in the incineration chamber, a high-filtration efficiency (small pore) material is used in the filter. However, to avoid impeding the air flow through the filter, the filter must have a large surface area to compensate for the reduced air flow velocity. Accordingly, the secondary filter incorporates a generally cylindrical form with open ends to allow the particulates to pass directly through, while the regeneration air passes radially through the cylindrical filter walls to an outlet. Preferably the secondary filter is mounted vertically to allow the particulates to fall assisted by gravity to the bottom of the incineration chamber.

A heater is located in the incineration chamber. Periodically, with the valve between the incineration chamber and the trap housing closed to isolate the incineration chamber, the heater is activated to burn the particulates collected in the trap.

The oxidation products may be exhausted to ambient or may be returned to the engine intake in an exhaust gas recirculation system. If returned to the engine, any partially oxidized species, such as CO and unburned hydrocarbons, are destroyed. Such an exhaust gas recirculation system may supplement a main EGR system to aid in the minimization of nitrogen oxides.

BRIEF DESCRIPTION OF THE DRAWINGS

These and other objects, aspects and features of the present invention will become apparent from the following description of the presently preferred embodiments thereof and from the drawings, wherein:

FIG. 3 illustrates in the FIGS. 3A through 3D thereof schematic drawings useful in explaining "flip-flap" valve operation of the diesel particulate and PAH trap in accord with the present invention;

FIG. 5 illustrates in the FIGS. 5A and 5B thereof top and side views of an electric burner of the diesel particulate and PAH trap in accord with the present invention;

FIG. 6 illustrates in the FIGS. 6A and 6B thereof schematic diagrams useful in explaining one type of regeneration of the diesel particulate and PAH trap in accord with the present invention;

FIG. 7 illustrates in the FIGS. 7A and 7B thereof graphs illustrating the performance of an exemplary embodiment of a diesel particulate and PAH trap in accord with the present invention;

DETAILED DESCRIPTION OF THE PREFERRED EMBODIMENTS

A. Pulsed Regeneration Filtration System

Figure 1:
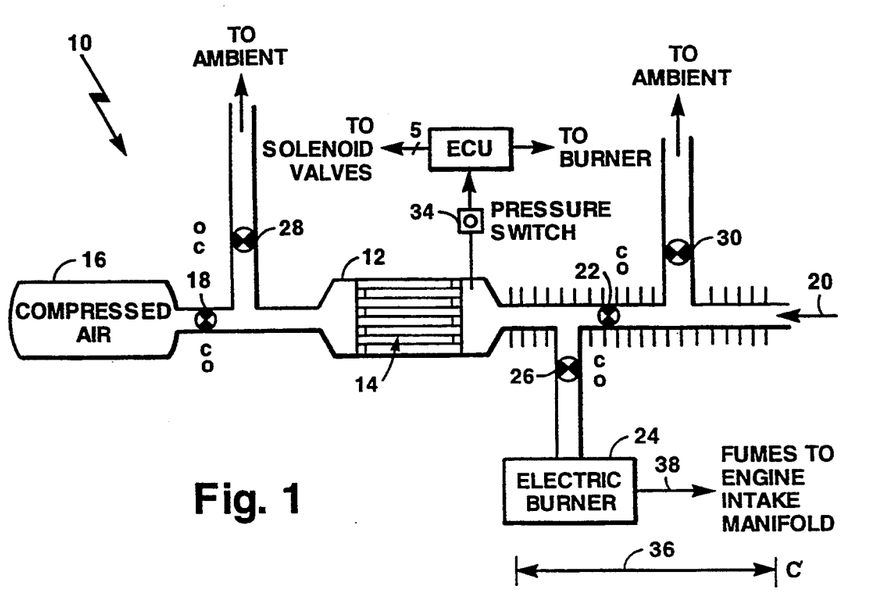
FIG. 1 is a schematic diagram illustrating one embodiment of the diesel particulate and PAH trap in accord with the present invention.

Referring now to FIG. 1, generally designated at 10 is a schematic diagram of one embodiment of the diesel particulate and PAH trap in accord with the present invention. The system 10 includes a casing member 12, such as a steel tube, into which a particulate trap generally designated 14 is rigidly attached, such as by bolted flanges, not shown, in such manner that the trap 14 presents opposing faces that open to either side of the member 12. In the preferred embodiment, two metallic rings, not shown, that fit both sides of the filter 14, hold the filter 14 inside the member 12 using six (6) bolts, not shown, and high-temperature resistant sealing gaskets, such as of red silicone, not shown, are preferably provided between each of the rings and the corresponding face of the filter 14.

The trap 14 may be any suitable diesel particulate and PAH trap, such as ceramic honeycomb monoliths. Exemplary filters that were tested were the NGK C-415 filter with a filtration efficiency of eighty percent (80%); the PANASONIC low-density, light weight R-type mullite fiber ($AL_2O_3$—$SiO_2$) corrugation filter with a filtration efficiency of eighty percent (80%); the CORNING EX-66 with seventy percent (70%) filtration efficiency, and the CERAMEM filter with over ninety-five percent (95%) filtration efficiency. The CERAMEM filter consists of a Corning EX-66 filter coated with a thin (approximately 50 micron) ceramic microfiltration membrane with fine pores (0.5 micron). It may be noted that due to its membrane characteristics, this filter, with its high filtration efficiency, is easily regenerable with back pulsing in a manner to be described, and as a consequence, any possibility for clogging, whether complete or partial, is eliminated.

A compressed air tank 16 is coupled through a valve 18 to one side of the filter 14 disposed in the member 12, and engine exhaust, schematically illustrated by arrow 20, is coupled to the other side of the filter 14 in the member 12 through a valve 22. An electric burner (or bag house) 24 is coupled to the same side of the filter 14 through a valve 26. A valve 28 is provided in a fluid path coupled between the valve 18 and the vessel 12, and a valve 30 is coupled in a fluid path between the engine exhaust 20 and the valve 22. The several fluid valves 18, 22, 26, 28 and 30 are marked by respective indicia "C, O", where the upper such mark indicates either the open (O) or the closed (C) state thereof during normal filtration operation to be described, and where the lower such mark indicates the state thereof during reverse-flow regeneration to be described.

An electronic control unit (ECU) 32 is coupled to the valves 18, 22, 26, 28 and 30, as schematically illustrated by the arrow marked by the number five (5), and is coupled to the burner 24. A pressure responsive switch 34 is coupled between the inside of the member 12 and the electronic control unit 32 to monitor the level of back pressure on the side of the filter 14 that is in communication with the engine exhaust 20. As schematically illustrated by arrow 36, the distance "d" between the diesel exhaust 20 and the member 12 is selected to allow the PAHs and other aliphatic unburnt hydrocarbons in the diesel exhaust to cool to a temperature below their corresponding boiling point temperature by the time they reach the trap 14. Thus, condensation of the PAHs on the carbonaceous soot is achieved. Cooling fins schematically illustrated by vertical marks 38, or other heat transfer means, may also be provided for this purpose.

Figure 2:
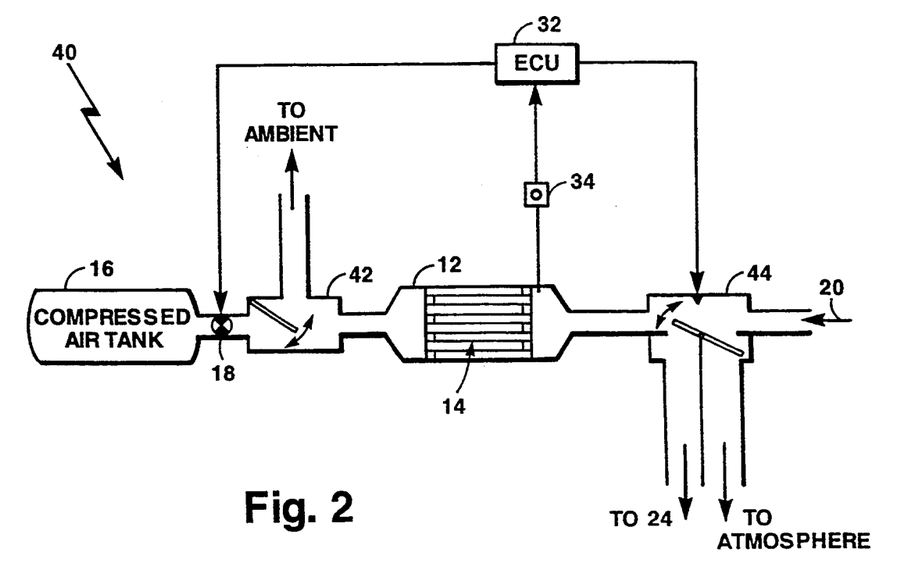
FIG. 2 is a schematic diagram of the embodiment of FIG. 1 illustrating "flip-flap" valves instead of the solenoid valves thereof.

Referring now to FIG. 2, generally designated at 40 is an embodiment of the diesel particulate and PAH trap that uses "flip-flap" valves instead of the solenoid valves of the FIG. 1 embodiment. The embodiment 40 differs from the embodiment 10 of FIG. 1 in the respect that a 3-way "flip-flap" valve 42 is positioned between the solenoid valve 18 and the face of the filter 14 confronting the compressed air tank 16 instead of the solenoid valve 28 (FIG. 1) and in the respect that a 4-way "flip-flap" valve 44 is coupled to the electronic control unit 32 and positioned between the engine exhaust 20 and the face of the trap 14 confronting the engine exhaust 20 instead of the three solenoid valves 22, 26, and 30 of the embodiment 10 of FIG. 1.

Figure 3A:
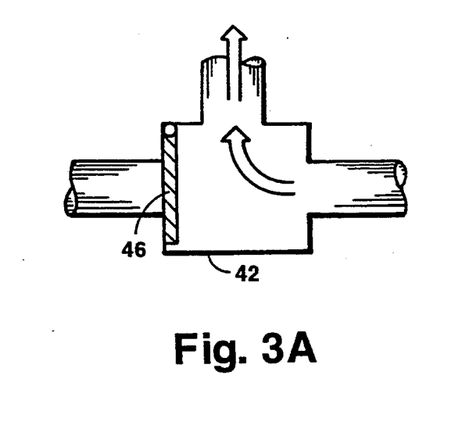
Figure 3B:
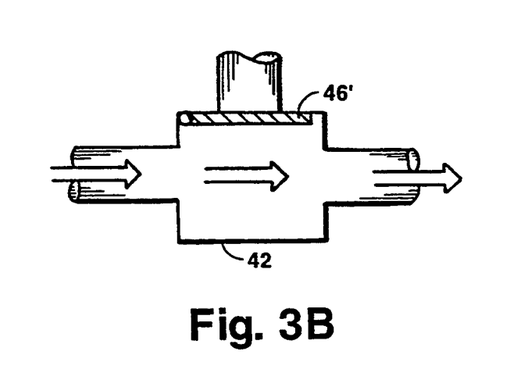

As shown in FIG. 3A, the three-way flip-flap valve 42 has a pivoting flap 46 that is held in the illustrated normal position by gravity during exhaust filtration to be described. During reverse-flow regeneration to be described the pressure of the one or more high-pressure and low-velocity pulses lifts the flap 46 up to the position illustrated at 46 as seen in FIG. 3B to enable each of the one or more pulses to dislodge the PAH-coated soot and ash from the trap 14 in a manner to be described.

Figure 3C:
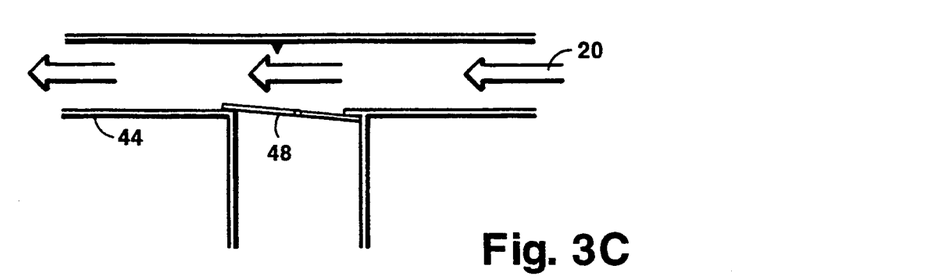
Figure 3D:
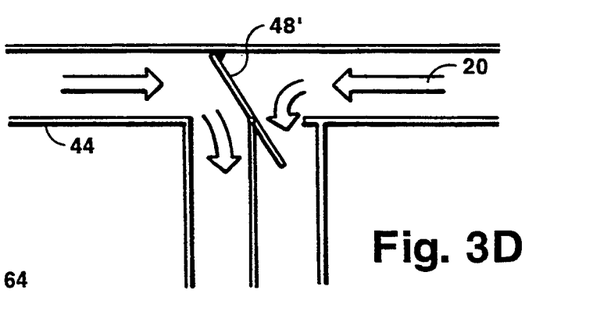

As shown in FIG. 3C, the 4-way flip-flap valve 44 has a pivoting double flap 48 that is held by gravity in the normal horizontal position that allows the engine exhaust 20 to flow toward the ceramic filter during normal filtration mode in a manner to be described. During reverse-flow regeneration to be described a solenoid actuator, not shown, lifts the double flap 48 up to the position 48' as seen in FIG. 3D to enable on the one hand the engine exhaust 20 to be diverted either to ambient or to a parallel filter to be described and on the other to enable the soot, ash and PAH laden air stream to be collected in the bag house or to be oxidized in the burner in a manner to be described. It should be noted that the valve 44 may be operated without a solenoid actuator so long as the pressure of each of the one or more high-pressure low-velocity pulses to be described is sufficient to lift the double flap 48 thereof to the position 48' illustrated in FIG. 3D.

Figure 4:
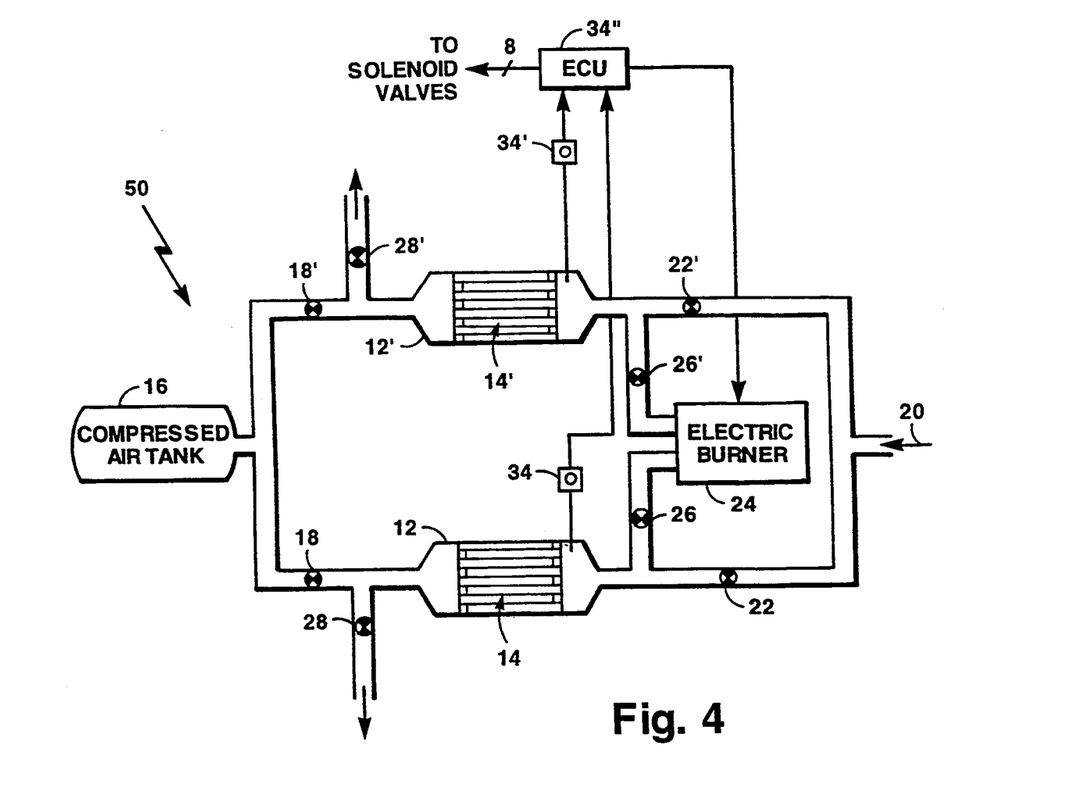
FIG. 4 is a schematic diagram illustrating another embodiment of the diesel particulate and PAH trap in accord with the present invention.

Referring now to FIG. 4, generally designated at 50 is another embodiment of a diesel particulate and PAH trap in accord with the present invention. The embodiment 50 differs from the embodiment 10 of FIG. 1 in the respect that the elements 12, 14, 18, 22, 26, 28 and 34 thereof coupled between the engine exhaust 20 and the compressed air tank 16 are duplicated in parallel by the corresponding elements 12', 14', 18', 22', 26', 28' and 34 ; in the respect that the electronic control unit 34" of FIG. 4 is connected to the eight (8) solenoid controlled valves 18, 18', 22, 22', 26, 26', 28, 28', rather than the five (5) valves of the embodiment 10 of FIG. 1; and in the respect that the ECU 34" operates differently than the ECU 34 of FIG. 1 to vent in a manner to be described the exhaust 20 alternately through one of the parallel filters 14, 14' while the other is being regenerated rather than by venting the exhaust 20 to ambient as in the embodiment 10 of FIG. 1 (and 40 of FIG. 2). It may be noted that since the FIG. 4 embodiment never vents the diesel exhaust 20 to ambient atmosphere but always filters the same in one of the parallel traps 14, 14', the solenoid valve 30 (FIG. 1) (and the corresponding structure in FIG. 2), that vents the same to ambient atmosphere, is rendered unnecessary in the embodiment 50 of the FIG. 4. It should be noted that as in the embodiment 40 of FIG. 2 where three-way and four-way flip-flap valves may be substituted for the corresponding solenoid valves of the embodiment 10 of FIG. 1, such flip-flap valves may also be substituted in the embodiment 50 of the FIG. 4.

Figure 5A:
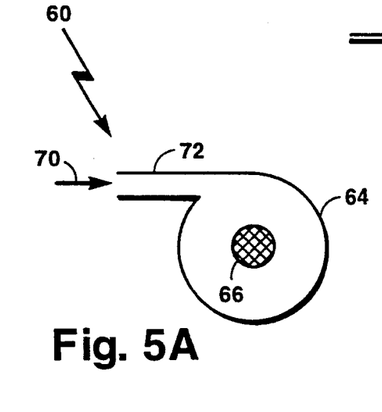
Figure 5B:
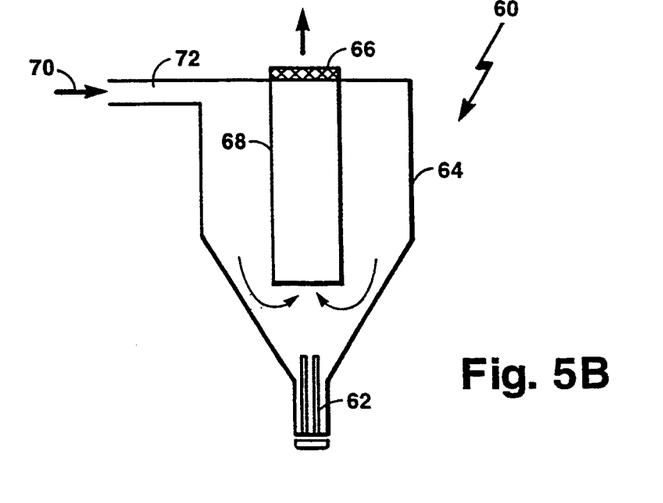

Referring now to FIGS. 5a and 5b, top plan and side sectional views of a presently preferred embodiment of the electric burner device 24 of the embodiments of FIGS. 1, 2 and 4 are illustrated. The burner device 60 consists of an electric heater 62 installed at the bottom of a metallic hopper 64, and a filtering element 66, such as a fabric filter, disposed at an open top mouth of an inner cylinder 68 concentrically disposed within the hopper 64 and axially aligned with the heater 62. An air flow schematically illustrated by an arrow 70 carrying the soot, PAHs and ash induced by pulsed reverse-flow regeneration to be described enters the annular space defined between the outer hopper 64 and the inner cylinder 68 through tangential inlet 72, thereby acquiring a rotating and vortical motion. The vortex flow carrying the soot, PAH and ash descends along the walls of the hopper 64 and then rises in the inner cylinder 68 while still rotating, and exits through the filtering element 66. The soot, ash and PAH particles that accumulate on the walls of the cylinders and the filtering element fall into the hopper and are oxidized by the electric heater 62. In place of the electric burner 60 other electric burners may be employed as well without departing from the inventive concept. A soot-collector such as a fabric bag made of Nomex Nylon with a very high capturing efficiency installed in a sealed container could be used as a bag house in place of the electric burner/cyclone subassembly without departing from the inventive concept.

In the normal filtration mode of operation of the single-filter embodiment 10 of the FIG. 1, the exhaust stream 20 from the diesel engine is controllably coupled by the ECU 34 to the soot, PAH and ash trap 14 such that its temperature is below the PAH condensation (boiling point) temperature. As the soot, ash and PAH particulates enter the trap 14, the soot, PAH and ash particulates are captured in the pores of the filter 14 as the exhaust stream 20 is passed therethrough. Downstream of the filter 14, the cleaned exhaust is controllably coupled by the ECU 34 to ambient. In the embodiment of FIG. 1, wherein solenoid valves are employed, the electronic control unit 34 opens the valves 22, 28 respectively leading to the filter 14 and leading away from the filter 14 to ambient to provide the fluid flow path from the engine to ambient while it closes the valves 18, 26, 30 that respectively lead to the pressurized air source 16, the burner device 24, and to the ambient atmosphere. The ECU 34' is operative to provide the same flow paths and connections by means of the valves 42, 44 in the embodiment 40 of FIG. 2.

Figure 6A:
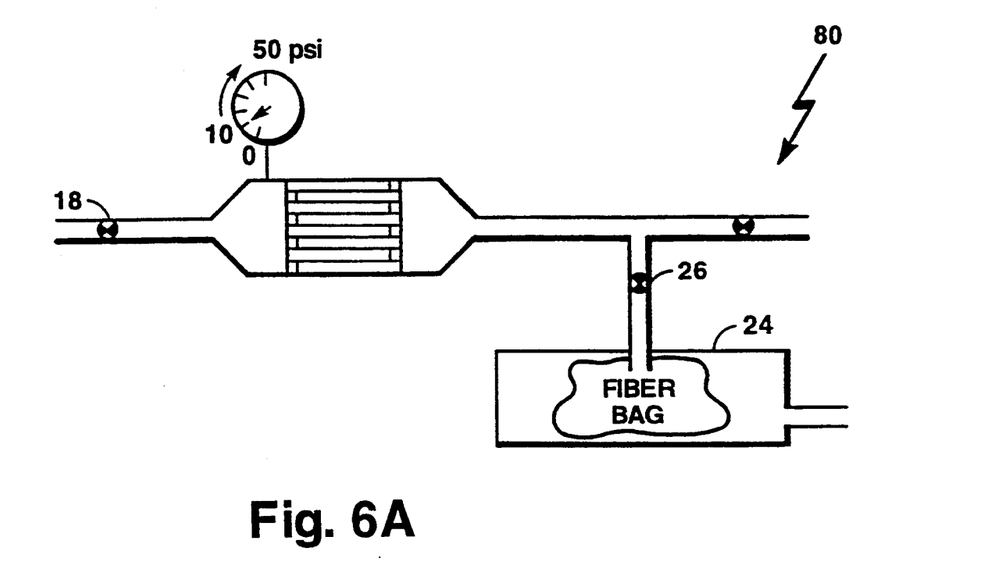
Figure 6B:
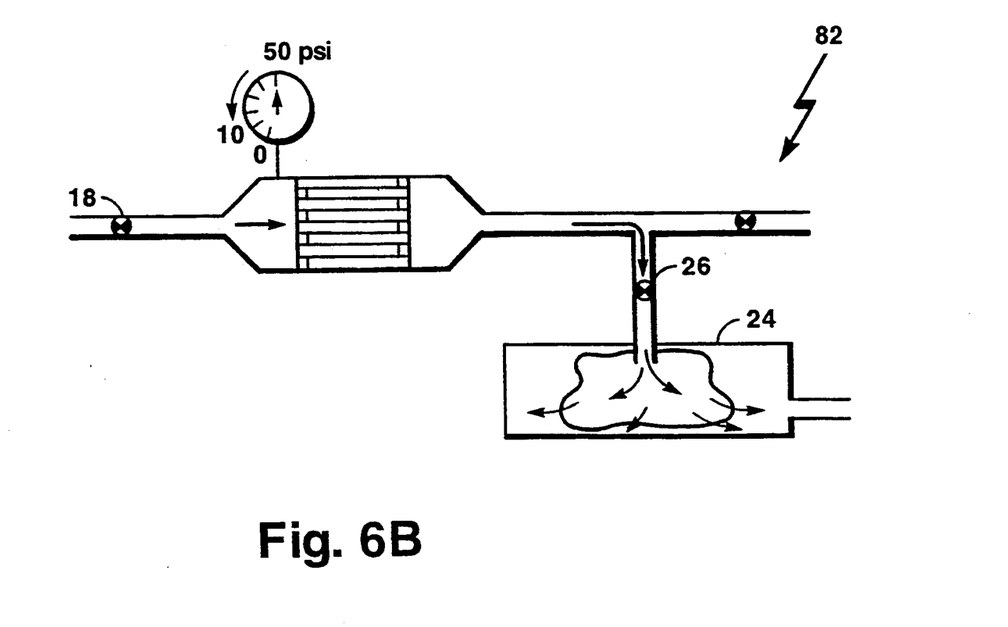

In the reverse-flow regeneration mode of operation of the single-filter embodiment of FIG. 1, the exhaust 20 from the diesel is controllably coupled by the ECU 34 to atmosphere upstream of the filtration element 14 during the time that the filter 14 is being regenerated, at least one pulse of high-pressure and low-velocity (low-mass) air from the compressed air tank 16 is controllably coupled to the side of the filter 14 remote from the diesel exhaust, and the exhaust stream laden with PAH, soot, and ash is controllably coupled to the burner 24. In the embodiment of FIG. 1, wherein solenoid valves are employed, the electronic control unit 34 opens the valves 18, 26 and 30 and closes the valves 22, 28 to provide the flow paths that couple the tank 16 to the member 12, couple the exhaust stream 20 to ambient and the reverse-flow output of the member 12 to the burner 24. The one or more pulses of high-pressure and low-velocity air may be provided from the compressed air tank 16 by controllably opening the solenoid control valve 18 at a low-duty-cycle, for example, about three-tenths (0.3) second each half-hour. Closing the valve 28 to ambient isolates the trap from the outside atmosphere; thus, the air flow upstream of the filter is maintained at a high pressure for the duration of the pulse. The low-duty-cycle of the one or more pulses prevents the consumption of the charge of the air cylinder and ensures the long-life operation of the reverse-flow regeneration subsystem of the invention. The one or more pulses of high-pressure and low-velocity air may also be provided by so controlling the valve 18 at the one end of the filter 14 and the valves 22, 26 at the other side of the trap 14 as to pressurize the member 14 as illustrated generally at 80 in FIG. 6a. When the pressure therein reaches a preselected pressure, the pressure built up in the member 12 is released on a sudden by controllably opening the valve 26 leading to the device 24 (illustrated in FIG. 6 as a collection device) while controllably closing the valve 18 as illustrated generally at 82 in FIG. 6b. In either embodiment, one or more pulses of high-pressure and low-velocity (low-mass) air effectively regenerate the filter 14 dislodging the soot laden with PAHs and ash entrapped therein. The ECU 34 is operative to provide the same flow paths and connects by means of the valves 42, 44 in the embodiment 40.

The embodiment of FIG. 4 operates either by back pulsing or by element vessel pressurization and exhaust (FIG. 6) in the same manner as that of the embodiments of FIGS. 1, 2, except that the exhaust of the diesel is not vented to ambient during pulsed reverse-flow regeneration but rather is controllably coupled by the ECU 34" via valves 22, 22' to one of two or more parallel soot (laden with PAHs) and ash traps 14, 14'; during reverse-flow regeneration of one parallel trap, say the unit 14, the diesel exhaust is fed to the other parallel trap 14', and vice versa. The exhaust 20 is then never vented to the ambient atmosphere during pulsed reverse-flow regeneration in the embodiment of FIG. 4. Each leg of the parallel embodiment 50 of FIG. 4 is otherwise operative in normal filtration and reverse-flow regeneration modes as the embodiments 10 and 40 are operative in these modes, and are not again described herein for the sake of brevity of explication.

In any of the embodiments herein, the regeneration can occur periodically, such as every half hour, or can be triggered whenever the pressure reading as provided by the corresponding sensor 34 of the corresponding particulate trap exceeds a predetermined pressure. Exemplary duty cycles of one-half hour to one hour, pressure ranges of three hundred forty-five (345) kPa to five hundred forty-five (545) kPa, and temperature ranges of one hundred seventy-five (175)° C. to one hundred ninety (190)° C. have been found to be effective.

Figure 7A:
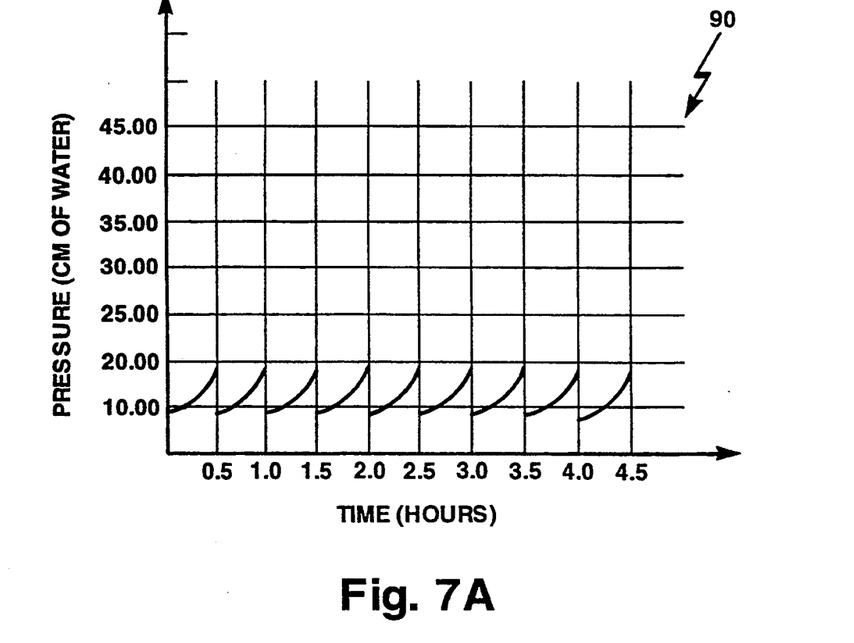
Figure 7B:
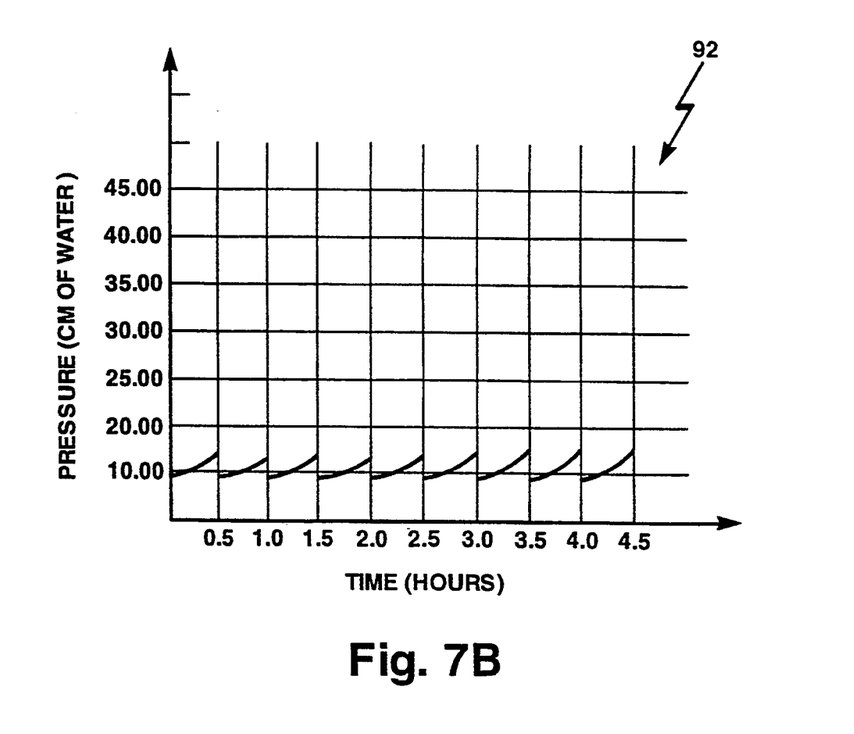

Generally designated at 90 in FIG. 7a and at 92 in FIG. 7b are graphs plotted with pressure as ordinate and time as abscissa that illustrate the performance of the pulsed reverse-flow regeneration subsystem in accord with the instant invention. The graph 90 was compiled from a PANASONIC filter and with regeneration of three (3) pulses at three hundred forty five (345) kPa every half hour and the graph 92 was compiled from a CERAMEM filter using three (3) one (1) second pulses each at three hundred forty five (345) kPa every half hour. As shown by the graphs 90, 92, the pulses effectively removed the soot, PAHs and ash as well from the respective filters.

Figure 8:
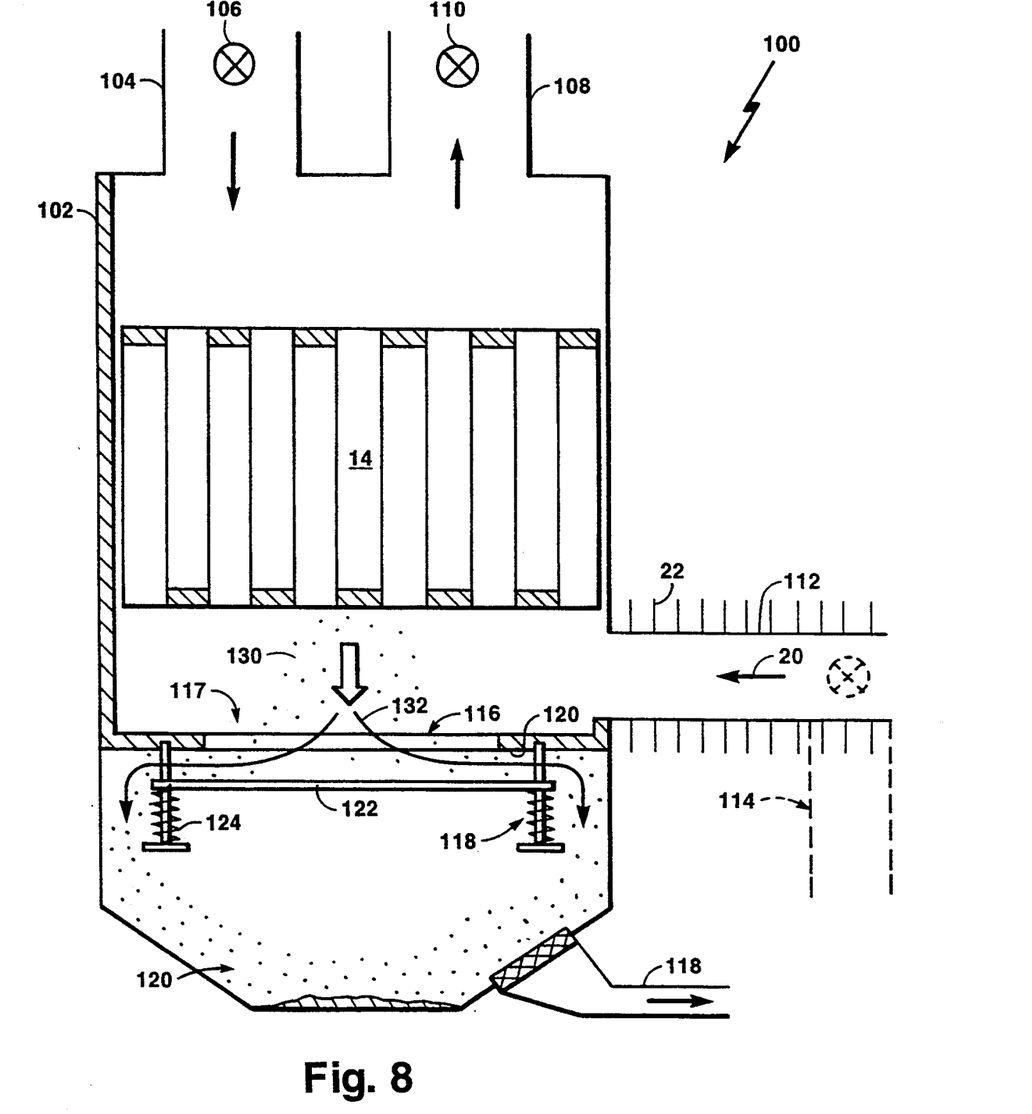
FIG. 8 is a schematic diagram of another embodiment of a pulsed, reverse-flow regenerated diesel trap capturing soot, ash and PAHs in accord with the present invention.

Referring now to FIG. 8, generally designated at 100 is a schematic diagram of another embodiment of the pulsed, reverse-flow regenerated diesel trap capturing soot, PAHs and ash in accord with the present invention. The system 100 differs from the single-filter embodiments heretofore in as much as the trap housing is vertical, not horizontal, in the respect that engine exhaust is fed through the trap during reverse-flow regeneration and in the respect that the burner subassembly is included in the same vertical housing as the trap. The embodiment 100 includes the ceramic filter 14 mounted in housing 102 having a top face and a bottom face. Any suitable mounting means, such as bolted flanges that hold both sides of the filter 14 inside the housing 102 with high-temperature resistant sealing gaskets, both not shown, are preferably provided between the housing 104 and each face of the trap 14.

A first conduit 104 connected to the top of the housing 102 is coupled to a compressed air source, not shown, via a solenoid valve shown schematically at 106, and an exhaust conduit 108 is coupled to ambient via solenoid valve illustrated schematically at 110. Both the conduits 104, 108 open to one face of the trap 14.

A conduit 112 is coupled between engine exhaust schematically illustrated by arrow 20 and the member 102, which conduit opens to the other face of the trap 14.

In an alternative embodiment shown dashed generally at 114, three-way solenoid valve and a conduct that communicates with the diesel exhaust conduit may be provided to vent the diesel exhaust to ambient as in the embodiments heretofore.

Floor generally designated 116 having central opening generally designated 117 is provided in the housing 102 below the trap 14, and a pressure-responsive door assembly generally designated 118 is mounted to the floor 116 in such wise that the opening 117 is closed by the door subassembly 118 during normal filtration mode, but is open during reverse-flow regeneration to allow dislodged particulates to be collected in burner device generally designated 120 mounted to the bottom of the member 102.

The door assembly 118 includes a door 122 end mounted on springs 124 that resiliently bias the door 122 against O-ring subassembly 126 provided on the confronting face of the floor 114.

The burner device 120 may be a coil heater or flame, like propane, butane and the like. A conduit 128 is provided off the combustion region of the burner that is coupled back to the engine intake to burn any PAHs that are revolitized during the combustion process.

Any suitable door assembly 122 may be employed, such as a center-opening door that opens in response to the pressure of the high-pressure and low-velocity regeneration pulses, or an electronically-actuated door, without departing from the inventive concept.

In operation, during normal filtration mode, the valves 106, 110 are controllably actuated by the electronic control unit, not shown, to couple the engine exhaust through the filter and out the engine exhaust output conduit 108; the conduit 104 is held closed by closing the valve 106, while the trap door 122 is held closed by action of the springs 124.

During reverse-flow regeneration, the engine exhaust is coupled to the filter (or alternatively to ambient via solenoid actuated valve 114), the conduit 108 is held closed by closing the valve 110, and the conduit 104 is opened by opening the valve 106.

During reverse-flow regeneration, high-pressure and low-velocity pulses of the type described hereinabove are controllably coupled through the reverse-flow regeneration conduit 104 through the filter 14, which pulses dislodge the accumulated particulates therewithin as schematically illustrated by matrix 130, while the exhaust is being fed therethrough. The pressure of the low-duty cycle, high-pressure and low-velocity pulses acts against the bias provided by the springs 124 and moves the door 122 into its opened condition, whereby the dislodged particulates 130 are forced around the door and are moved into the burner device as schematically illustrated by arrows 132. During the particulate burning process, the conduit 128 couples any PAHs that may revolitize back to the engine, thereby ensuring that they get burned again and absorbed so that no vapors are released to the atmosphere.

It will be appreciated that a conduit may be coupled off the burner device to enable the other embodiments herein to burn revolitized hydrocarbons. It will also be appreciated that engine exhaust may be coupled through the traps of the other embodiments herein during reverse-flow regeneration in alternative embodiments thereof. It will also be appreciated that flip-flop valves may be employed in lieu of the solenoid valves of the embodiment of FIG. 8.

B. Filtered Exhaust Gas Recirculation

Figure 9:
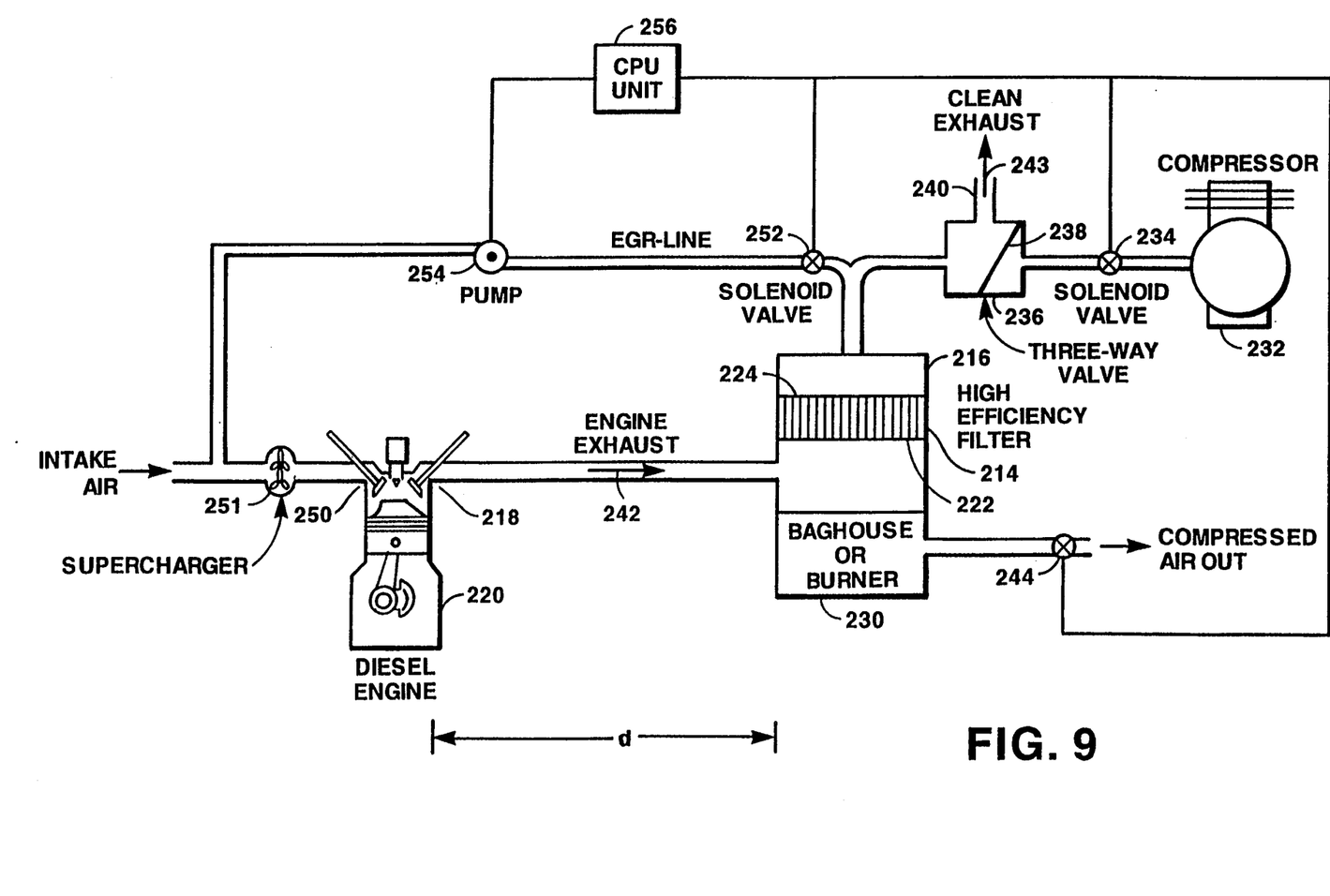
FIG. 9 is a schematic diagram illustrating an embodiment of a filtered exhaust gas recirculation system in accord with the present invention.

FIG. 9 schematically illustrates an embodiment of a filtered exhaust gas recirculation system for a diesel engine in accordance with the present invention. The system includes a filter 214 rigidly attached in a casing 216 which is rigidly attached within an exhaust gas flow path leading from an exhaust gas outlet 218 of a diesel engine 220. The face 222 of the filter 214 is oriented to receive the exhaust gas flow from the engine. As schematically illustrated in FIG. 9, the distance "d" between the diesel exhaust and the filter 214 may be selected to allow the PAHs and other aliphatic unburnt hydrocarbons in the diesel exhaust to cool to a temperature below their corresponding boiling point temperature by the time they reach the filter. Thus, condensation of a fraction of the volatile hydrocarbons on the carbonaceous soot is achieved.

The filter 214 comprises a diesel particulates and volatile hydrocarbon trap having a particulate filtration efficiency of at least 95 percent and preferably at least 99 percent. If exhaust gas is recirculated to an engine equipped with a turbocharger or supercharger at the intake of the compressor, at least 99 percent of the particulates must be removed, since the particulates are excessively destructive to such devices. The previously described CERAMEM filter is a suitable filter, which achieves a 99 percent efficiency. This filter comprises a ceramic honeycomb monolith, as previously described, in which walls are arranged in parallel to define a honeycomb arrangement of parallel channels. One end of each channel is blocked, adjacent channels being blocked at opposite ends, such that gas entering the open ends of one set of channels must pass through the pores in the walls to exit the open ends of the adjacent channels. In addition, the walls of the CERAMEM filter are coated with a thin ceramic (approximately 50 micron thick) microfiltration membrane having pores on the order of 0.5 microns. Such fine pores are suitable for trapping soot, which has an aggregate particle diameter in the range of 0.5 to 1 $\mu$m. In this manner, the CERAMEM filter functions as a surface filter, in which particles are trapped on the surface of the walls, rather than as a depth filter, in which particles become embedded within the walls. Particles on the wall surfaces are more easily removed by aerodynamic regeneration than particles embedded in the walls.

Returning to FIG. 9, a compressed air source 232 is coupled through a solenoid valve 234 to the opposing face 224 of the filter 214 remote from the engine exhaust gas outlet 218. Buses and trucks are frequently equipped with an air compressor, which may serve as the source of compressed air in the present invention. A three-way valve 236, such as a flip-flap valve, is coupled in the flow path between the air compressor 232 and the filter 214. A hinged flap 238 operates to alternately close off the flow path to the air compressor 232 or the outlet 240 to ambient.

During operation in the filtration mode, the engine exhaust from the engine exhaust outlet 218, schematically illustrated by arrow 242, is directed through the filter 214, in which the particulates are deposited. The flap 238 of the three-way valve 236 is positioned by gravity to close off the flow path between the air compressor 232 and the three-way valve and open the flow path to ambient via the outlet 240, schematically illustrated by arrow 243. The solenoid valve 234 is closed, so that no compressed air enters the system.

A burner or other collection device 230 is coupled to the face 222 of the filter 214 and is preferably included within the same casing 216 as the filter, as indicated with respect to the embodiment of FIG. 8, described previously. In this embodiment, the filter casing 216 is preferably mounted vertically with respect to the engine exhaust. A pressure responsive door assembly is mounted in the filter casing below the filter, as shown with more particularity in FIG. 8. During operation in the filtration mode, the door assembly is biassed closed, but the door assembly opens in response to the flow of air from the compressor during reverse-flow regeneration to allow dislodged particulates to be collected in the collection device. The compressed air is exhausted to ambient during the reverse-flow regeneration mode via a solenoid valve 244 which is closed during the filtration mode.

A recirculation or EGR line 248 is located with an upstream entrance in the exhaust line between the face 224 and the three-way valve 236. The recirculation line has a downstream exit at the engine intake manifold 250, or at a supercharger 251 or turbocharger (not shown) if the engine is so equipped. A solenoid valve 252 is located near the upstream end of the line to control the amount of clean gas admitted to the EGR line. A pump 254 may be provided in the EGR line to pressurize and regulate the flow, if necessary, as is known in the art. The length of the recirculation line between the filter and the engine intake and the location of the EGR line upstream entrance is selected to cool the recirculated gas to a lower temperature, preferably in the range of 20° to 40° C., prior to its introduction to the engine. A cooler gas is denser, and more gas can thereby be recirculated into the engine for more efficient $NO_x$ reduction.

A central processor unit (CPU) 256 is coupled to the valves 234, 244, and 252 and to the pump 254. A pressure responsive switch as previously described by reference to FIGS. 1, 2, and 4 may be coupled between the inside of the casing 216 and the CPU to monitor the level of back pressure on the side 222 of the filter 214 that is in communication with the engine exhaust.

In operation during the filtration mode, the exhaust stream 242 from the diesel engine 220 is directed to and through the particulate filter 214. As the particulates enter the filter, the particulates are captured in the pores of the filter walls or membrane coating as the exhaust stream passes therethrough. Downstream of the filter 214, the cleaned exhaust gas is coupled to ambient via the three-way valve 236 to the pressure of the exhaust gas flow on the flap 238 to close off the flow path to the compressed air source, while the valve 234 for the compressed air source is closed under the control of the CPU. Additionally, a portion of the cleaned exhaust gas is controllably directed out of the exhaust line into the recirculation line 248 through the valve 252 under the control of the CPU. Tests have shown that ten percent recirculation leads to a reduction in the $NO_x$ emissions of approximately forty percent. A fifteen percent recirculation rate leads to approximately a sixty percent reduction in $NO_x$ emissions. A twenty percent recirculation rate leads to approximately an eighty percent reduction in $NO_x$ emissions. Typically, approximately ten to fifteen percent of the cleaned exhaust gas is directed to the recirculation line. A greater percentage of the cleaned exhaust gas may be directed into the recirculation line if desired. However, recirculation rates of greater than fifteen or twenty percent begin to effect engine performance significantly.

In the reverse flow regeneration mode of operation, at least one pulse of high-pressure air from the compressed air source is controllably coupled to the side 224 of the filter remote from the diesel exhaust. The one or more pulses of high-pressure air may be provided from the compressed air source 232 by controllably opening the solenoid control valves 234 and 244 and closing the valve 252 in the EGR line at a low-duty-cycle, for example, about three-tenths (0.3) second each half-hour, to provide a flow path that couples the compressed air source to ambient via the filter 214 and the collection device 230. The pulse of air is sufficient to move the hinged flap 238 of the three-way valve to close off the outlet 240 to ambient, thereby allowing the pressure to build up evenly across the face 224 of the filter. The pulse of air passes down and through the filter 214, dislodging the particles therein, and impinges on the door assembly of the collection device (see FIG. 8) to open the door. The dislodged particles are retained in the collection device. The low-duty-cycle of the one or more pulses prevents the consumption of the charge of the air cylinder and ensures the long-life operation of the reverse-flow regeneration subsystem of the invention.

Additionally, it is generally not necessary to close off the exhaust stream 242 from the engine 220 or couple the exhaust stream to ambient. By locating the collection device directly below the filter and opening the valve 244 to ambient, the pulse of air is directed toward the collection device through the door assembly thereof, rather than toward the engine. Also, for a pulse of a short duration, such as 0.3 second, the backpressure in the line from the engine does not significantly affect engine operation. However, valves closing off the flow from the engine or directing the exhaust to ambient, such as valves 22 and/or 30 of FIG. 1 as previously described, may be provided if desired.

Filtering recirculated exhaust gas according to the present invention thus obviates problems of engine wear due to contamination of the lubricating oil with soot. The benefits of EGR can be realized, and reduction of particulate emissions can be achieved as well. In addition, corrosion problems in the intake manifold are minimized, since sulfates are also partially removed in the trap by condensation on the soot. Also, the pulsed regeneration system is highly reliable since is does not rely on thermal regeneration of the ceramic filter which can lead to high temperature failures of the ceramic by melting or cracking.

Figure 10:
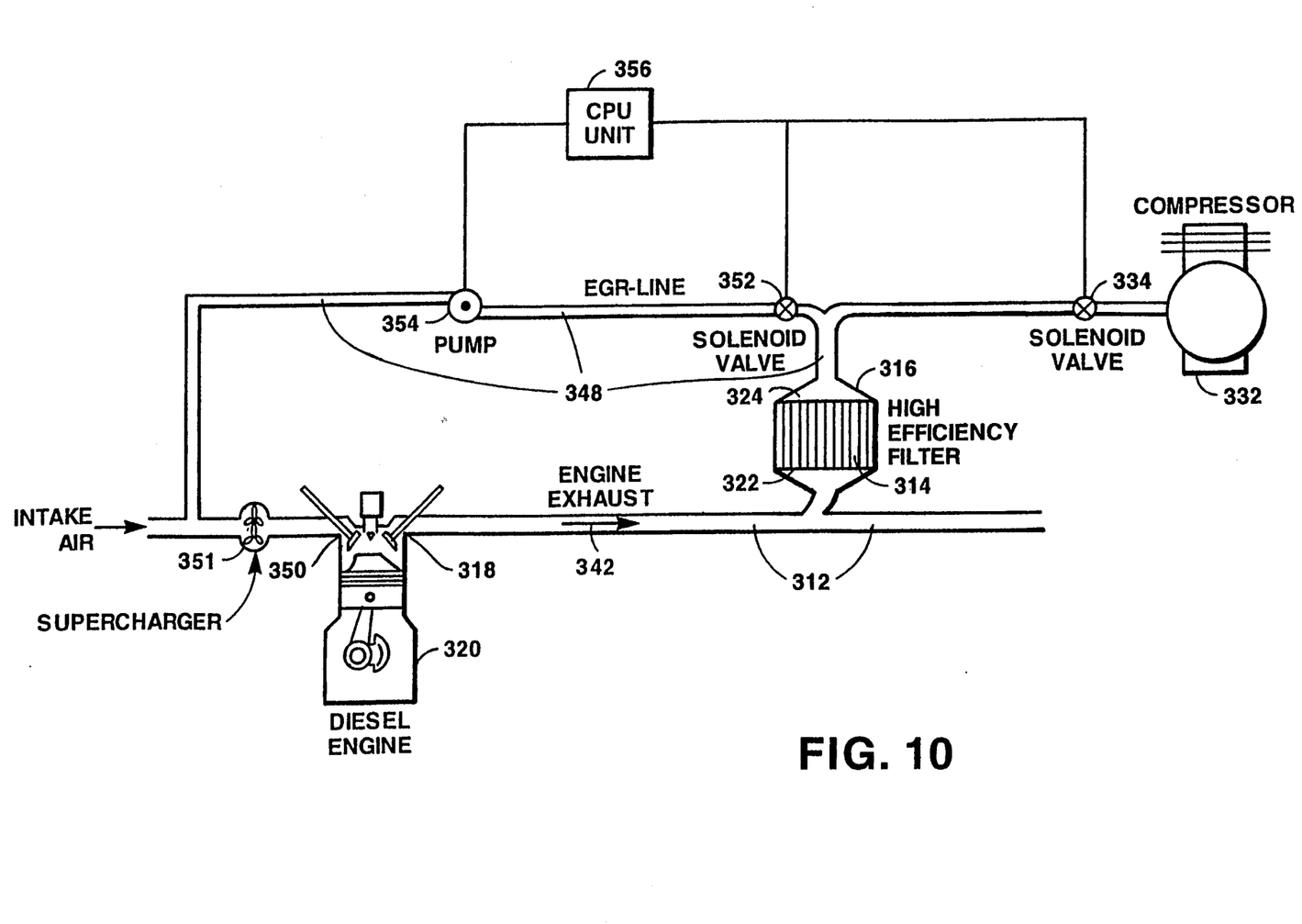
FIG. 10 is a schematic diagram illustrating another embodiment of the filtered exhaust gas recirculation system in accord with the present invention.

Referring now to FIG. 10, a schematic diagram of another embodiment of the filtered exhaust gas recirculation system of the present invention is shown. An exhaust gas flow path 312 extends from a diesel engine 320. A recirculation or EGR line 348 branches from the exhaust gas flow path at a location downstream of the engine 320. The downstream end of the recirculation line communicates with the engine intake manifold 350, or supercharger 351 or turbocharger (not shown) if the engine is so equipped. A solenoid valve 352 in the EGR line controls the amount of gas flow on the EGR line. A pump 354 is also provided in the EGR line to pressurize and regulate the flow, as is known in the art. The length of the recirculation line and the location of its upstream entrance in the exhaust gas line is selected to cool the recirculated exhaust gas to a lower temperature, preferably in the range of 20° to 40° C., prior to its introduction to the engine.

A filter 314, rigidly attached in a casing 316, is located in the EGR line 348 near the upstream end thereof with opposing faces 322, 324 in line with the recirculation exhaust gas flow. The filter comprises a diesel particulates and PAH trap having a filtration efficiency of $\geq 95\%$. The CERAMEM filter previously described is capable of providing such a high filtration efficiency. As schematically illustrated in FIG. 10, the distance from the engine 320 to the face 322 is selected to allow the PAHs and other aliphatic unburnt hydrocarbons in the diesel exhaust to cool to a temperature below their corresponding boiling point temperature by the time they reach the filter. Thus, partial condensation of the volatile hydrocarbons on the carbonaceous soot is achieved.

A compressed air source 332 is coupled via a solenoid valve 334 to the face 324 of the filter 314 disposed in the line 348. A central processor unit (CPU) 356 is coupled to the valves 334 and 352 and the pump 354. A pressure responsive switch may be coupled between the inside of the casing 318 and the CPU to monitor the level of the backpressure on the side 322 of the filter 314 that is in communication with the engine exhaust.

In operation during the filtration mode, the exhaust stream, schematically indicated by arrow 342, is directed into the exhaust gas flow path 312. A portion of the exhaust gas stream is controllably diverted into the recirculation line 348, where the flow is passed to and through the particulate filter 314. Valve 334 is closed. As the particulates enter the filter, the particulates are captured in the pores of the filter as the exhaust stream passes therethrough.

In the reverse flow regeneration mode of operation, the valve 352 in the EGR line is closed and the valve 334 is opened and at least one pulse of high-pressure air from the compressed air tank is controllably coupled to the side 324 of the filter 314 remote from the engine outlet. The one or more pulses of air effectively regenerates the filter by dislodging the particulates entrapped therein. Additionally, the distance between the face 322 of the filter 314 and the flow path 312 is selected to be sufficiently small so that the pulse of air readily delivers the entrapped particulates into the exhaust gas flow line. This embodiment is suitable for applications where control of particulates is not required but $NO_x$ reduction is desired, and in applications which would nevertheless generate sufficient particulates to damage the engine if recirculated with the unfiltered exhaust gas.

In any of the embodiments herein, the regeneration can occur periodically, such as every half hour, or can be triggered whenever the pressure reading as provided by a pressure sensor associated with the corresponding particulate filter exceeds a predetermined pressure. Exemplary duty cycles of one-half hour to one hour and pressure ranges of 3.0 to 6 atm (gage) have been found to be effective. Also, although the valves have been described as solenoid or flip-flap valves, any other suitable valves may be provided.

C. Flow-Through Soot Incineration

Figure 11:
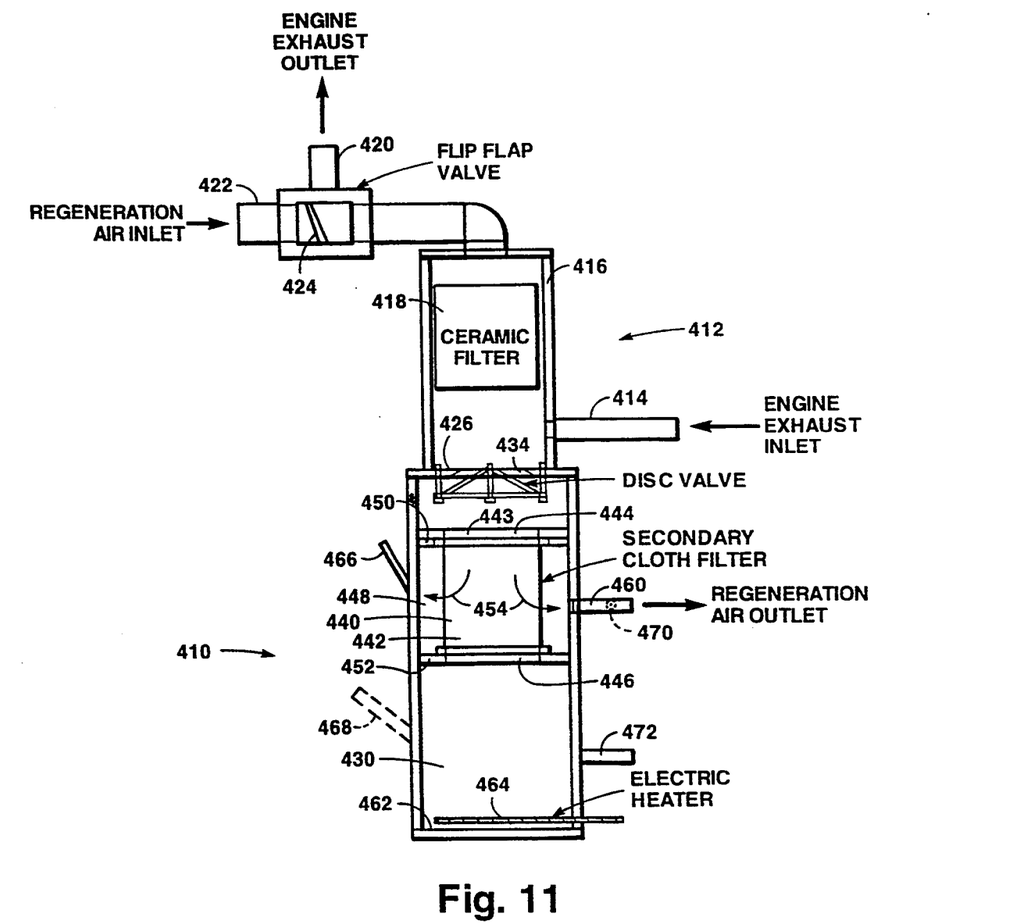
FIG. 11 is a schematic diagram illustrating a flow-through incineration system coupled to a diesel particulate trap in accord with the present invention.

Referring now to FIG. 11, a flow-through soot incineration system 410 according to the present invention is coupled to an aerodynamically regenerated particulate trap system 412, such as that previously described. Engine exhaust is introduced through an engine exhaust inlet 414 into a casing or housing 416 in which is mounted a primary trap 418 comprising, for example, a ceramic monolith as described above. Particulates are captured on the walls of the primary trap 418 while the engine exhaust passes through the trap and flows through an engine exhaust outlet 420 coupled to the opposite side of the trap. Periodically, pulses of compressed air are introduced through a regeneration air inlet 422 to dislodge the particulates trapped in the primary filter. A flip flap or other suitable valve mechanism 424, as described above, directs the regeneration air through the trap in a direction opposite to the flow of exhaust gas from the engine through the trap. Preferably, the housing 416 is mounted vertically, so that particulates dislodged from the trap fall toward a bottom wall 426 of the housing.

An incineration chamber 430 is provided downstream of the dislodged particulates such that the dislodged particulates can be directed into the incineration chamber. Preferably, the incineration chamber is located vertically below the particulate trap housing 416. A valve or other suitable closure device 432, such as that shown in FIG. 8, is provided at an opening 434 in the wall 426 between the incineration chamber and trap housing. The valve is biassed into a closed position to block the opening and is opened only during the pulse of regeneration air to admit the air and entrained particulates into the incineration chamber 430. During other times, the valve 432 remains closed to isolate the incineration chamber 430 from the particulate trap housing 416. The valve may, for example, be electromechanically actuated, such as a solenoid valve, or mechanically actuated, such as a spring loaded door or plate which is pushed open by the pressure of the pulse of regeneration air. Any other suitable valve or closure mechanism may be provided.

A secondary filter 440 is mounted inside the incineration chamber 430. The filter has a generally cylindrical, hollow configuration with open ends 444, 446. The filter allows passage of the regeneration air therethrough, but prevents passage of the particulates. The cylindrical walls of the filter 440 are formed from a high filtration efficiency, high temperature resistant cloth 442 configured as a hollow cylinder and mounted in any suitable frame or housing 443 to maintain the cylindrical configuration. The filter frame 443 is mounted in the incineration chamber 430 such that the cylinder ends 444, 446 remain open. An annular space 448, sealed at the top 450 and bottom 452, is formed around the exterior of the cylindrical filter. Any suitable manner of mounting the cylindrical filter 440 and sealing the annular space 448 may be used. Regeneration air passes radially through the cloth walls 442 and into the annular space 448, as indicated by arrows 454. The particulates are prevented from passing into the annular space by the cloth walls 442.

To remove the submicron particles of soot, a high-filtration efficiency (small pore) material must be used in the filter. However, such material is known as a "slow filter," that is, the better the filtration efficiency, the lower the velocity of flow that can pass through it. Reducing the flow of the regeneration air, however, may undesirably reduce the cleaning effectiveness of the air. Thus, to provide a fine filter without impeding the air flow, a large surface area is used, to compensate for the reduced velocity per unit area. The surface area may be increased by providing a sufficiently large filter. Alternatively or in addition, the filter cloth may be pleated to increase the surface area.

Suitable filter cloths are commercially available from known sources, such as Rosendale in California, which has a high temperature resistant polymeric cloth, or 3M, which has a ceramic fiber mesh. The average pore size of the cloth may be chosen to suit the application. For typical diesel engine exhaust applications, the average pore size may range from 0.1 to 10 $\mu$m. The cloth temperature resistance should be at least 250° C. to withstand the temperatures in the incineration chamber.

A regeneration air outlet 460 is provided in the incineration chamber in communication with the annular space 448 surrounding the cylindrical filter 440. The regeneration air passes radially through the filter cloth and is exhausted to ambient through the outlet. Particulates are prevented from passing into the annular chamber and air outlet by the filter. Preferably, the filter is oriented vertically, so that retained particulates fall by gravity to the bottom 462 of the incineration chamber 430. A burner element 464 is located in the bottom of the incineration chamber for periodically burning the retained particulates. The burner may have any suitable configuration, such as flat or spiral. The burner element is preferably electrically powered, although any suitable burner element, such as is known in the art, may be provided.

One or more cleaning air jets 466 may be provided to backpulse the secondary filter 440. Such jets may be used to dislodge any particulates, such as soot, that have stuck to the filter cloth rather than fallen to the bottom of the incineration chamber. The jets may also be useful in dislodging particulates if the filter cannot be mounted vertically within the incineration chamber.

In operation, the valve 432 between the trap housing 416 and the incineration chamber 430 is closed after the pulse or pulses of regeneration air have dislodged the particulates from the primary trap and transported the particulates to the incineration chamber. The incineration chamber is isolated from the primary trap by the closing of the valve. The burner 464 is turned on, generally for several minutes, to burn the particulates. Combustion air may be provided through the one or more cleaning air jets 466 or through additional air ports 468, shown in phantom, provided in the incineration chamber for this purpose. Alternatively, the regeneration air outlet may be opened, either permanently or by an optional valve 470, to allow air to enter the incineration chamber. If desired, the regeneration air outlet may be closed via the valve during combustion.

The gaseous products of oxidation, predominantly $N_2$, $CO_2$, $H_2O$, and small amounts of CO and unburned hydrocarbons may be exhausted through an outlet 472 to ambient or may be returned to the engine intake in an exhaust gas recirculation system. In the engine, any partially oxidized species, such as CO and unburned hydrocarbons, are destroyed. Such an exhaust gas recirculation system may provide a supplement to a main EGR system, such as described above, and aid in the minimization of nitrogen oxides.

A controller, such as that previously described, may be used to provide any necessary control. For example, the controller may be in communication with the burner to turn the burner on for a predetermined period of time, such as ten to fifteen minutes, after each regeneration cycle. Similarly, the controller may be in communication with any solenoid valves if such valves are used in the system.

Many modifications of the presently disclosed invention will become apparent to those skilled in the art having benefitted from the instant disclosure without departing from the inventive concept.

I claim:

1. A diesel engine exhaust gas filtration and incineration system for reducing total particulate emissions in diesel exhaust from a diesel engine comprising:
 a diesel engine exhaust gas conduit having a diesel exhaust inlet port couplable to a diesel engine and a diesel exhaust outlet port couplable to ambient;
 a regenerable particulate trap having pores sized to capture particles therewithin that are contained in the diesel exhaust, said filter disposed in said diesel engine exhaust conduit between said diesel exhaust inlet port and said diesel exhaust outlet port;
 a source of compressed air controllably coupled to said diesel engine exhaust gas conduit between said particulate trap and said diesel exhaust outlet port;
 a particulate incineration unit coupled to said diesel engine exhaust gas conduit between said particulate trap and said inlet port, said incineration unit comprising a burner and a filter, said filter comprising a generally cylindrical wall having pores sized to prevent passage of the particulates therethrough and permit passage of air therethrough, said wall further having a surface area sized to maintain a flow rate of air from said source of compressed air; and
 a controller, operatively coupled to said source of compressed air and operable in a filtration mode for coupling diesel exhaust in said diesel exhaust gas conduit through said particulate trap and directing filtered exhaust gas out said diesel exhaust output port, and further operable in a regeneration mode to provide at least one pulse of high pressure Air from said source of compressed air that flows through said particulate trap in a direction that dislodges soot (laden with PAH) and ash particles that are lodged within the pores thereof and that moves the soot (laden with PAH) and ash particles into said incineration unit.

2. The invention of claim 1, wherein said incineration unit is located vertically below said particulate trap, whereby dislodged soot laden with PAH and ash particles are directed into said incineration unit.

3. The invention of claim 1, further comprising a closure between said filter and said incineration unit, said closure being biassed closed during said filtration mode and openable during said regeneration mode, whereby dislodged soot laden with PAH and ash particles are carried through said opened closure into said incineration unit.

4. The invention of claim 3, wherein said closure comprises a closure member spring biassed into a closed position and operable upon exertion of pressure by the at least one pulse of high pressure air.

5. The invention of claim 3, wherein said controller is in communication with said closure to open said controller in the regeneration mode.

6. The invention of claim 1, wherein said incineration unit comprises a housing defining an incineration chamber.

7. The invention of claim 6, wherein said burner is located in a bottom portion of said chamber, and said filter is located above said burner.

8. The invention of claim 6, wherein said filter is mounted within said incineration chamber to define a space about the exterior of said filter, and further comprising an air outlet port to ambient in communication with said space about said filter.

9. The invention of claim 4, further comprising a sealing member to seal said space from a remaining portion of said incineration chamber.

10. The invention of claim 6, further comprising a combustion product outlet in communication with said incineration chamber.

11. The invention of claim 10, wherein said combustion product outlet is in further communication with ambient.

12. The invention of claim 10, wherein said combustion product outlet is in further communication with an engine intake to provide recirculation of said combustion products to said engine for reburning.

13. The invention of claim 1, wherein said incineration unit further comprises an air cleaning jet directed toward said generally cylindrical wall to dislodge particulates therefrom.

14. The invention of claim 1, wherein said incineration unit further comprises an air inlet port to provide combustion air to said incineration unit.

15. The invention of claim 1, wherein said wall of said filter comprises a high temperature resistant polymeric cloth.

16. The invention of claim 1, wherein said wall of said filter comprises a ceramic fiber mesh.

17. The invention of claim 1, wherein said pores of said wall of said filter have an average pore size of 0.5 $\mu$m.

18. The invention of claim 1, wherein said pores of said wall of said filter have an average pore size between 0.1 and 10 $\mu$m.

19. The invention of claim 1, wherein said wall of said filter comprises a cloth having a temperature resistance of at least 250° C.

20. The invention of claim 1, wherein said wall of said filter comprises a pleated configuration.

21. The invention of claim 1, further comprising an air inlet valve coupled to said source of compressed air and in communication with said controller for gating said air inlet valve to provide said at least one pulse.

22. The invention of claim 1, wherein the portion of said diesel exhaust conduit between said diesel exhaust inlet port and said particulate trap has a preselected length selected to allow entrained PAH particles sufficient time to cool to below their decomposition temperature by the time they reach said particulate trap along said diesel exhaust flow path.

23. The invention of claim 1, further including heat transfer means mounted along the portion of said diesel exhaust conduit defined between said diesel exhaust inlet port and said particulate trap.

24. The invention of claim 1, wherein said particulate trap has a particulate filtration efficiency of at least ninety-five percent.

25. The invention of claim 1, wherein said pores of said particulate trap are sized to trap particles having an aggregate particle diameter of 0.5 to 1 $\mu$m.

26. The invention of claim 1, further comprising a three-way valve coupled between said particulate trap and said source of compressed air, said three-way valve operable to direct cleaned exhaust gas to said diesel exhaust outlet port during said filtration mode and operable to close said diesel exhaust outlet port and to direct the air from said source of compressed air to said particulate trap during said regeneration mode.

27. The invention of claim 1, wherein said three-way valve comprises a flip-flap valve.

28. The invention of claim 1, wherein said burner comprises an electric burner.

29. The invention of claim 1, wherein said controller is in communication with said burner and operable to activate said burner for a predetermined period of time.

* * * * *